Oct. 13, 1936.  F. M. VANDERVOORT  2,057,073
CHANGE SPEED MECHANISM
Filed Jan. 10, 1935   2 Sheets-Sheet 2

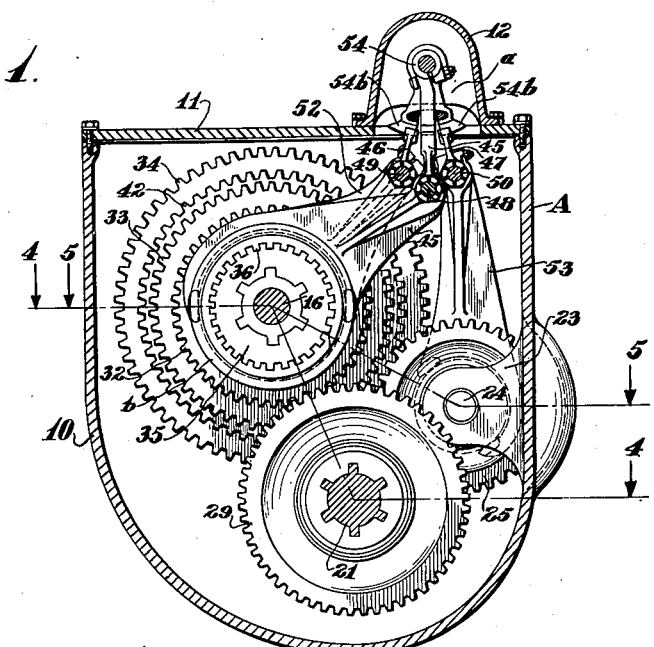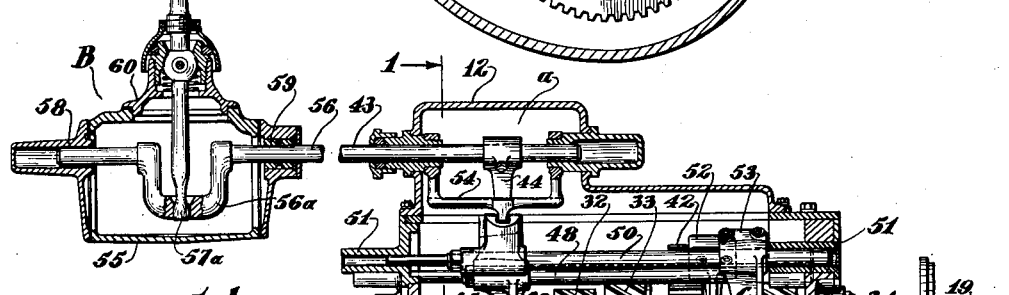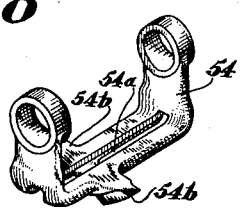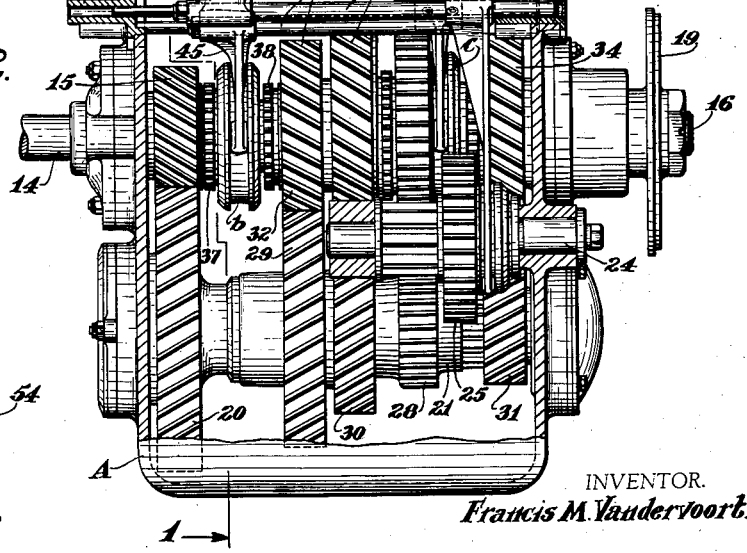

INVENTOR.
Francis M. Vandervoort
BY R M Cooper
ATTORNEY.

Patented Oct. 13, 1936

2,057,073

UNITED STATES PATENT OFFICE 2,057,073

CHANGE SPEED MECHANISM

Francis M. Vandervoort, Cleveland, Ohio, assignor to The White Motor Company, Cleveland, Ohio, a corporation of Ohio Application January 10, 1935, Serial No. 1,201

4 Claims. (Cl. 74—333)

This invention relates to change speed mechanisms, and more particularly to change speed mechanisms for automotive vehicles.

It is an object of this invention to provide a simple and efficient change speed mechanism of the constant-mesh gear type.

It is a further object of this invention to provide a compact relatively short four-speed change speed mechanism of the type above defined.

It is a further object of this invention to provide an arrangement of gearing for producing a reverse drive which can be employed in conjunction with a forward speed gearing of the sliding-clutch type to secure a compact change speed gearing of relatively short length.

Other objects will appear in the following description of an embodiment of the invention, when read in connection with the accompanying drawings in which:

Figure 1 is a sectional view of a change speed gear box, the section being taken on line 1—1 of Figure 2.

Figure 2 consists of a side elevation of the gear box shown in Figure 1 with a part of the casing broken away, and of a sectional view of a shifting mechanism used in conjunction with the gear box.

Figure 3 is a detail view of a swinging member mounted in the upper part of the gear box.

Figure 4:
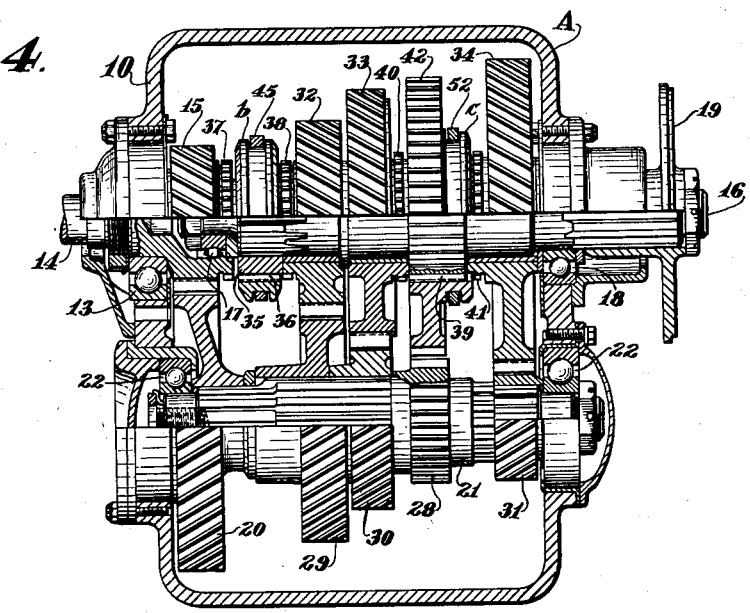
Figure 4 is a sectional view of the gear box taken on line 4—4 of Figure 1.
Figure 5:
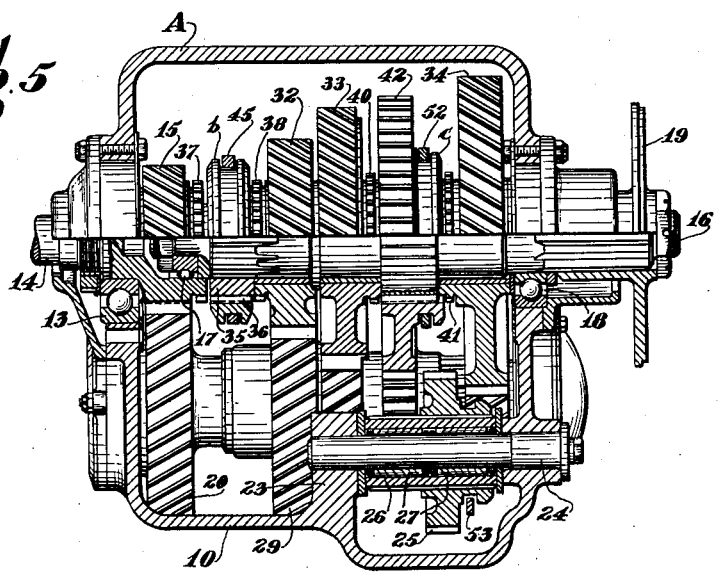
Figure 5 is a sectional view of the gear box taken on line 5—5 of Figure 1.

Referring to the drawings, the speed change mechanism therein illustrated comprises two units, a gear box A and a shifting mechanism B. The gear box A is constructed with a housing consisting of a main casing 10, a slotted cover 11 for the casing 10, and an auxiliary casing 12 which encloses the upper part of a shifting mechanism a. Extending into the forward end of the casing 10 and supported by a bearing 13, there is a driving shaft 14 which when the gear box is installed within a motor vehicle is driven in a conventional manner by the engine of the vehicle. The inner end of the shaft 14 is formed with an integral gear 15 which is axially bored to provide a bearing for an aligned driven shaft 16. The driven shaft 16 is supported at its front end within the gear 15 by means of a roller bearing 17, and at its rear end is supported within an aperture in the rear wall of the casing 10 by means of a ball bearing 18. Secured upon the rear end of the shaft 16, there is a flanged member 19 through which the shaft 16 is connected with the driving mechanism of the vehicle upon which the gear box is installed. The gear 15 meshes with a gear 20 rigidly fixed upon a countershaft 21 mounted below the driven shaft 16 and supported in ball bearings 22 mounted in the end walls of the casing 10. Mounted in a web 23 of the casing 10 and in the rear end wall of the casing 10 at one side of the countershaft, there is a pin 24 which supports a reverse idler 25. The idler gear 25 is slidably and non-rotatably mounted on a splined sleeve 26 which is rotatably supported upon the pin 24 by means of roller bearings 27.

The countershaft 21 is constructed with a rigidly affixed gear 28 designed for meshing engagement with the reverse idler gear 25 and with three rigidly affixed gears 29, 30 and 31 which mesh with three constantly driven gears 32, 33, and 34 rotatably mounted upon the driven shaft 16. Splined upon a sleeve 35 non-rotatably mounted on the forward end of the shaft 16, there is a clutch member $b$, the inner splined teeth 36 of which are designed for engagement with teeth 37 formed on the gear 15 and with teeth 38 formed on the gear 32. Splined directly upon the shaft 16 intermediate the gears 33 and 34, there is a second clutch member $c$ the inner splined teeth 39 of which are designed for engagement with teeth 40 on the gear 33 and with teeth 41 on the gear 34. The clutch member $c$ is formed with a gear wheel 42 designed to mesh with the reverse idler gear 25.

Assuming that in each instance the clutch members $b$ and $c$ and the gear 25 initially occupy the positions shown, four forward speeds and a single reverse speed are obtained as follows:

First speed, by shifting the clutch member $c$ in a rearward direction to bring its teeth 39 into engagement with the teeth 41 on the gear 34, and the forward ends of the teeth on the gear 42 into mesh with the teeth of the reverse idler gear 25, the resulting drive being through gears 15, 20, 31, and 34 with the reverse idler gear 25 running idle.

Second speed, by shifting the clutch member $c$ in a forward direction to bring its teeth 39 into engagement with the teeth 40 on the gear 33, the resulting drive being through gears 15, 20, 30, and 33.

Third speed, by shifting the clutch member $b$ in a rearward direction to bring its teeth 36 into engagement with the teeth 38 on the gear 32, the resulting drive being through gears 15, 20, 29, and 32. Fourth speed or direct drive, by shifting the clutch member $b$ in a forward direction to bring its teeth 36 into engagement with the teeth 37 on the gear 15, and reverse, by shifting the gear 25 in a forward direction to bring its teeth into mesh with the teeth of the gear 28 on the countershaft and the teeth of the gear 42 on the clutch member c, the resulting drive being through gears 15, 20, 28, 25, and 42.

The reason for constructing the gearing in such a manner that the teeth of the gear 42 are brought into engagement with the teeth of the reverse idler gear 25 in establishing first speed drive, is to attain a greater reduction in the length of the transmission than could otherwise be accomplished.

The shifting mechanism a associated with the gear box comprises a shaft 43 mounted for longitudinal movement and rotatable oscillation within the casing 12. Secured upon the shaft 43 is a finger 44, the free end of which is formed for engagement between the bifurcated upper ends of a fork 45 and members 46 and 47 mounted respectively on shifter rods 48, 49 and 50 supported in bushings 51 mounted in the end walls of the casing 10. The shifter rod 48 is connected to the clutch b by means of the fork 45, and the shifter rods 49 and 50 to the clutch c and the gear 25 by means of forks 52 and 53. Rotatably mounted within the casing 12 in concentric relation to the shaft 43, there is a cradle 54 formed with a slot 54a which receives the finger 44 and with lugs 54b designed for engagement between the bifurcated ends of the members 46 and 47 and the fork 45. This cradle turns with the finger 44 and through the instrumentality of the lugs 54b acts to lock the shifter rods in neutral position except when operatively connected to the finger 44.

The shifting mechanism B comprises a casing 55, a shaft 56 which is connected to the shaft 43 associated with the gear box, and a shifting lever 57. The shaft 56 is formed with a crank portion 56a, and is slidably and rotatably mounted in bearings 58 and 59 in the front and rear walls of the casing 55. The shifting lever 57 is mounted for universal movement in a cover 60 secured to the top of the casing 55, and is formed at its lower end with a ball 57a which is engaged within a slot in the lower portion of the crank 56a of the shaft 56. Through this arrangement the lever 57 when moved longitudinally causes the shaft 56 and the co-ordinated shaft 43 to be shifted in a reverse direction, and when the lever 57 is moved transversely the shaft 56 and the co-ordinated shaft 43 are rotated in a corresponding direction.

In effecting a speed change, the shafts 56 and 43 are rotated through transverse movement of the lever 57 moving the finger 44 out of engagement with the upper bifurcated end of one of the members 45, 46, or 47 into engagement with the end of another of such members. The lever 57 is then moved forwardly or rearwardly to effect the speed change desired with a resulting longitudinal movement of the shafts 56 and 43 and the finger 44 producing a longitudinal movement of the shifter rod connected to the finger, and shifting the associated parts of the gear box. In accomplishing such operation, the cradle 54 is turned by the finger 44 to a position where one or the other of the lugs 54b, or both of the lugs, depending upon the driving connection initiated, acts to lock in neutral positions, the shifter rods retained in such positions. It will be seen from an examination of the drawings that when the reverse idler gear 25 is moved into mesh with the gear 42 on the clutch c to initiate a reverse drive, the shifter rod 49 and consequently the clutch c will be locked in neutral position by the lug 54b shown at the left in Figure 1.

By constructing the speed change gearing in the manner described, it is possible to construct all the gears with helical teeth except the gears 25, 28 and 42, and to thereby obtain a quiet drive in all forward speeds. By employing the gear combination 25, 28, and 42 to produce reverse drive instead of a gear combination of conventional design, a considerable reduction in the length of the gear box is effected.

Although the foregoing description is necessarily of a detailed character, in order that the invention may be completely set forth, it is to be understood that the specific terminology is not intended to be restrictive or confining, and that various rearrangements of parts and structural details may be resorted to without departing from the scope and spirit of the invention as herein claimed.

What I claim is:

1. In a change speed mechanism, a shaft, a gear disposed in concentric relation to said shaft and mounted for relative rotation with respect thereto, a second shaft located at one side of said first named shaft, a gear fixed on said second shaft meshing with said first mentioned gear, means for driving one of said shafts, a clutch member non-rotatably mounted on said first named shaft in a position closely adjacent said first mentioned gear and arranged and designed to connect said first mentioned gear with said first named shaft, a gear fixed on said clutch member, a second gear fixed on said second named shaft in alignment with said clutch member, means for establishing a driving connection between the gear on said clutch member and the aforesaid second gear on said second named shaft comprising a gear slidably and non-rotatably mounted at one side of said first and second named shafts and arranged to occupy a position closely adjacent the aforesaid second gear in which it is engaged by the gear on said clutch member when said clutch member is moved to a position to connect said first mentioned gear with said first named shaft.

2. In a change speed mechanism, a shaft, a pair of gears disposed in concentric relation to said shaft and mounted for relative rotation with respect thereto, a second shaft located at one side of said first named shaft, a pair of gears fixed on said second shaft each meshing with one of said first mentioned gears, means for driving one of said shafts, a clutch member non-rotatably mounted on said first named shaft between said first mentioned gears, said clutch member being arranged and designed to separately connect said first named shaft with said first mentioned gears, a gear fixed on said clutch member, a third gear fixed on said second named shaft in alignment with said clutch member, and means for establishing a driving connection between the gear on said clutch member and the aforesaid third gear on said second named shaft comprising a gear slidably and rotatably mounted at one side of said first and second named shafts.

3. In a change speed mechanism, a shaft, a pair of gears disposed in concentric relation to said shaft and mounted for relative rotation with respect thereto, a second shaft located at one side of said first named shaft, a pair of gears fixed on said second shaft each meshing with one of said first mentioned gears, means for driving one of said shafts, a clutch member non-rotatably mounted on said first named shaft between said first mentioned gears, said clutch member being arranged and designed to separately connect said first named shaft with said first mentioned gears and being further so arranged and designed as to occupy a neutral position between said first mentioned gears, a gear fixed on said clutch member, a third gear fixed on said second named shaft in a position such that it is in alignment with the aforesaid gear on said clutch member when said clutch member occupies a neutral position, and means for establishing a driving connection between the gear on said clutch member and the aforesaid third gear on said second named shaft comprising an idler gear slidably and rotatably mounted at one side of said first and second named shafts, and arranged to occupy a position intermediate said third gear on said second shaft and one of the gears of the aforesaid pair of gears associated with such shaft.

4. In a change speed mechanism, a shaft, a pair of gears disposed in concentric relation to said shaft and mounted for relative rotation with respect thereto, a second shaft located at one side of said first named shaft, a pair of gears fixed on said second shaft each meshing with one of said first mentioned gears, means for driving one of said shafts, a clutch member non-rotatably mounted on said first named shaft between said first mentioned gears, said clutch member being arranged and designed to separately connect said first named shaft with said first mentioned gears, a gear fixed on said clutch member, a third gear fixed on said second named shaft in alignment with said clutch member, and means for establishing a driving connection between the gear on said clutch member and the aforesaid third gear on said second named shaft comprising a gear slidably and rotatably mounted at one side of said first and second named shafts, said last named gear being arranged to occupy a position closely adjacent one of the aforesaid gears on said second shaft in which it is engaged by the gear on said clutch member when said clutch member is moved to a position to connect said first mentioned shaft with the gear associated therewith which meshes with the aforementioned gear on said second shaft.

FRANCIS M. VANDERVOORT.